United States Patent [19]

Treyssac

[11] 4,338,195

[45] Jul. 6, 1982

[54] LIQUID TREATMENT APPARATUS

[75] Inventor: Georges Treyssac, Marcq-en-Baroeul, France

[73] Assignee: Societe Anonyme d'Etudes de Recherches et de Productions d'Agents Chimiques ERPAC, France

[21] Appl. No.: 203,256

[22] Filed: Nov. 3, 1980

[51] Int. Cl.³ ............................................. B01D 21/24
[52] U.S. Cl. .................................. 210/519; 210/802; 210/521
[58] Field of Search ................................ 210/519–522, 210/800–802, 703, 221.1, 320

[56] References Cited

U.S. PATENT DOCUMENTS

| | | | |
|---|---|---|---|
| 3,221,889 | 12/1965 | Hirsch | 210/519 |
| 3,951,818 | 4/1976 | Bosnjak | 210/522 |
| 4,127,488 | 11/1978 | Bell et al. | 210/519 |
| 4,194,976 | 3/1980 | Robinsky | 210/519 |

FOREIGN PATENT DOCUMENTS 847203 9/1960 United Kingdom ................ 210/519

*Primary Examiner*—Benoit Castel
*Attorney, Agent, or Firm*—Robert E. Burns; Emmanuel J. Lobato; Bruce L. Adams

[57] ABSTRACT

An apparatus is provided for the treatment of a liquid flowing substantially horizontally in a tank from an inlet area to an outlet area to make it possible to impose on the flow of the liquid, in a treatment area of the tank, a distribution of predetermined speeds according to the treatment. The liquid is introduced into the inlet area or is discharged from the outlet area in distinct streams on which is imposed a variable but predetermined rate of flow, depending on their location and the distribution of speeds which it is wished to impose on the liquid in the treatment area.

8 Claims, 8 Drawing Figures

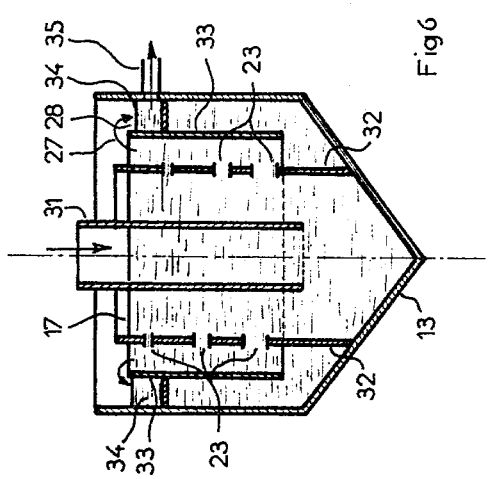
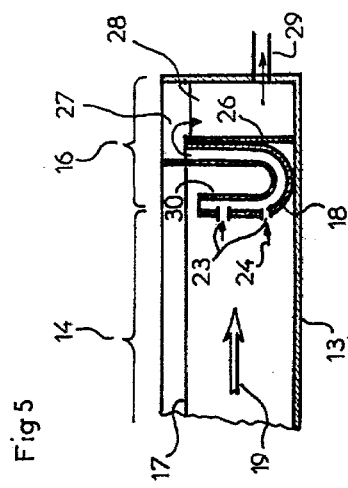
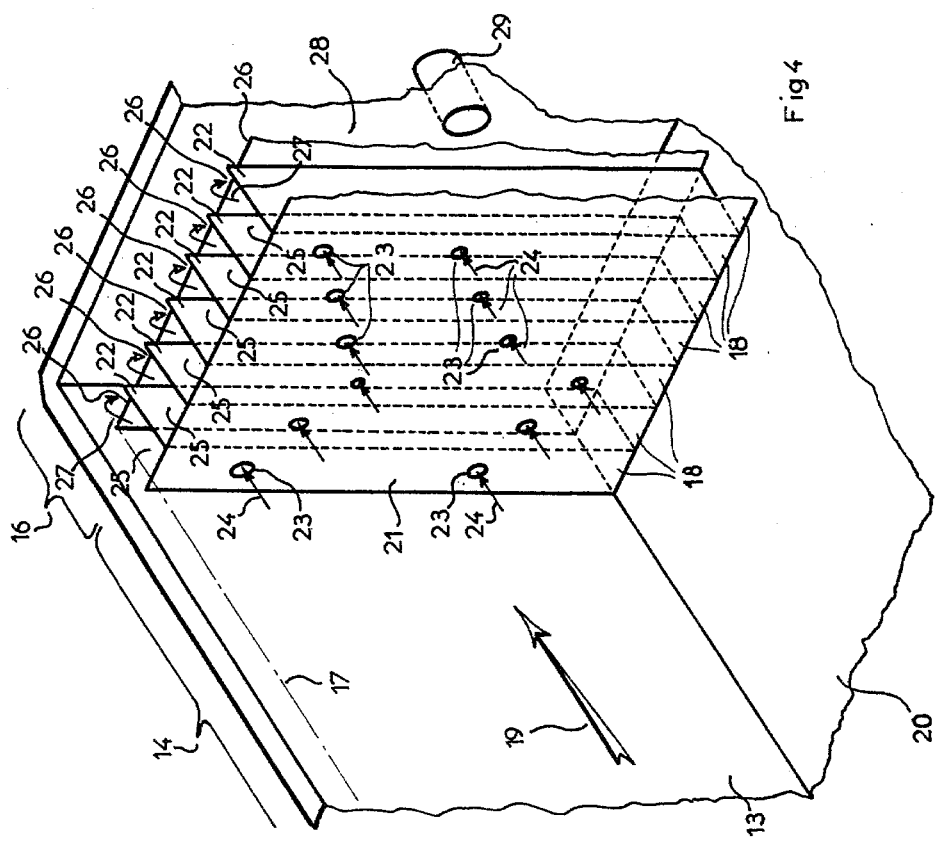

LIQUID TREATMENT APPARATUS

The invention relates to an apparatus for the treatment of a liquid. More particularly, the invention relates to an apparatus making it possible to establish a predetermined law of distribution of speed in the flow of liquid, within a tank in which it undergoes a treatment.

The invention proposes to control and determine the flow of a liquid within a tank, depending on the treatment which it undergoes in this tank.

BACKGROUND ART

At present, a liquid flowing substantially horizontally in a tank and undergoing a treatment as it flows, such as for example a decantation or flotation treatment, may be introduced into the tank or extracted from this tank by different means.

First means consist of introducing or extracting the liquid through a pipe opening into the inside of the volume of the tank. This method of introduction or extraction may be improved by using an overflow, i.e. by distributing the introduction or extraction area of the liquid substantially over the entire width of the tank. Throughout the volume of the tank, these introduction or extraction means create preferential areas of flow of the fluid on the one hand and still areas on the other hand, i.e. areas of the volume of the tank where the liquid is substantially static. In fact, the speed of the liquid in the introduction area or extraction area is considerable with regard to the speed of flow of the liquid, for example in the central area of the tank. Consequently, the flow of liquid will tend to develope in an area having the shape of a cone or bevel converging towards the introduction or extraction area of the liquid. Around this preferential area of flow, the liquid will be substantially static, i.e. the preferential area of flow will be surrounded by still areas.

Other means for controlling the flow of a fluid within a tank, where it undergoes a treatment, consist of partitioning-off this tank by perforated walls and of forcing the fluid to flow inside these perforations. Generally, between the walls, oblique partitions define channels which promote the flow and treatment of the liquid. However, the perforations have identical dimensions, which in the volume of the tank causes a flow of the fluid which is not suitable for the treatment which it undergoes, in view of the fact that this flow tends to be substantially uniform throughout the volume of the tank. As an example, we can state that in the case of decantation, the concentration of impurities is greater in the lower part than in the upper part and that for this reason a uniform flow of liquid in the tank is not suitable for the treatment of this liquid. An apparatus of this type is described in U.S. Pat. No. 3,898,164.

One of the objects of the present invention is to propose an apparatus for the treatment of a liquid, flowing in a tank, which makes it possible to determine and control a distribution of speeds of the liquid throughout the entire volume of the tank, which is suitable for the treatment which this liquid undergoes in the tank. According to the invention, the distribution of speeds of the liquid in the tank is determined from the inlet area or from the outlet area, i.e. from the introduction area or from the extraction area of the liquid.

One of the objects of the present invention is thus to determine a distribution of speeds which is suitable for the treatment which the liquid undergoes in the volume of the tank.

Another object of the present invention is to prevent the creation of still areas and preferred areas of flow in the tank, i.e. in fact to optimize the treatment of the liquid in the tank by determining and adapting the distribution of the speeds to the treatment which it undergoes.

Furthermore, it should be noted that the invention relates to the methods and apparatus for the treatment of a liquid flowing substantially horizontally in a tank, whether or not this treatment requires the use of specific treatment means, such as distribution channels or paddles.

The specific treatment means with which the apparatus according to the present invention may be associated have been widely described in the literature of existing patents, in particular in the field of the decantation of liquids. In this respect we can cite British Pat. No. 22,556, U.S. Pat. No. 2,673,451, British Pat. No. 1,042,935, U.S. Pat. No. 3,399,135, British Pat. No. 1,351,801, U.S. Pat. No. 3,666,112, U.S. Pat. No. 3,951,818, U.S. Pat. No. 3,847,813, etc.

Such documents describe specific treatment means such as distribution channels or paddles which facilitate the treatment of the liquid and accelerate it. The apparatus according to the present invention may complement apparatus of this type described in these documents. In fact, specific treatment means of this type cause disturbances in the flow of liquid, which the apparatus according to the present invention is able to compensate or correct from the inlet or outlet. In fact, as will become apparent hereafter, the apparatus according to the invention makes it possible to control the distribution of speeds of the liquid within the tank, from the inlet or outlet and thus to accelerate the liquid in favourable areas, i.e. in areas where the liquid is not treated with maximum efficiency and thus to slow the latter down in unfavourable areas, i.e. areas where the treatment to which the liquid is subjected exceeds saturation.

In the prior art, the overall speed of the liquid was determined in order that the treatment which the liquid undergoes in unfavourable areas is not saturated. On the contrary, in the present case, by modifying the distribution of speeds, all the areas of flow of the liquid in the tank are given speeds such that the treatment which the liquid undergoes is optimum in all these areas.

Generally speaking, the pressure drop which the liquid undergoes in the tank is defined by the difference in levels between the liquid at the inlet and outlet. It is this pressure drop which defines the overall rate of flow of the liquid in the tank. The present invention proposes to control this overall rate of flow by imposing a predetermined speed distribution within the volume of the tank.

It should also be noted that the invention relates not only to the treatment of a liquid by decantation or by flotation, but to all types of treatment of a liquid where it is advantageous to determine and control a distribution of speeds which improves the efficiency of said treatment.

DISCLOSURE OF INVENTION

According to the method of treatment of the invention, the liquid is introduced into the tank or extracted from the tank, by a plurality of basic streams of which the rate of flow is determined individually. This makes it possible to modify the flow of the liquid throughout the entire volume of the tank with respect to flows of the prior art and to adapt the latter to the treatment which the liquid undergoes in the tank.

The invention also relates to apparatus implementing the method.

BRIEF DESCRIPTION OF DRAWINGS

FIGS. 4 to 7 show diagrammatically different embodiments of the apparatus according to the invention.

MODE OF CARRYING OUT INVENTION

Figure 1:
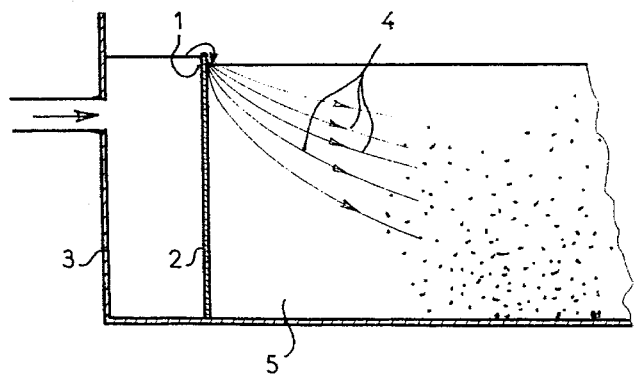
FIGS. 1 and 2 show diagrammatically the introduction of a liquid into a tank according to the prior art, in the case of the treatment of a liquid by decantation.

In the method for the treatment of a liquid according to the invention, the liquid is made to circulate from the inlet area to the outlet area in a tank. This tank comprises an inlet area and an outlet area, i.e. an introduction area and an extraction area for the liquids. These two areas are located on either side of a treatment area, which constitutes the main part of the tank, this treatment area either comprising or not comprising specific treatment means such as distribution paddles or channels. The liquid enters the tank through inlet areas, passes through the treatment area where it is subjected to the treatment and is discharged from the outlet area.

According to the invention, a predetermined distribution of speed is imparted to the stream of liquid circulating throughout the volume of the tank, according to the treatment which the fluid undergoes in the tank and which is adapted to the latter. This distribution of speed is imposed from the inlet area or from the outlet area. In fact, from the inlet area or from the outlet area, it is possible to introduce or extract the liquid in a plurality of basic streams, each of which is given a variable but predetermined rate of flow.

The rate of flow of each basic stream is determined as a function of the distribution of speeds which one wishes to obtain in the tank and depending on the location of the introduction or extraction orifice for this basic stream in the inlet area or in the outlet area.

The invention thus proposes to introduce or extract the liquid in basic streams, to determine the location of each basic stream in the inlet area or in the outlet area and to improve a predetermined rate of flow upon each basic stream.

As an example, in the case of the treatment of a liquid by decantation, the concentration of impurities is greater in the lower part of the tank than in the upper part of the tank. In this case, the invention proposes to give the liquid a higher speed in the upper areas of the tank than in the lower areas. On the one hand, this distribution of speeds facilitates the decantation phenomenon, in view of the fact that it takes into account variations in the concentration of impurities in the volume of the tank. On the other hand, since the liquid is decanted more quickly at the surface, the flow on the surface may be more rapid.

In this example, the distribution of speeds may be imposed from the inlet area or from the outlet area, i.e. by exerting a pressure on the basic streams of liquid, or suction. However, preferably, in this precise case, the invention prefers to control the distribution of speeds from the outlet area so as not to exert a detrimental influence on the formation of flocks which are formed at the time of decantation.

In order to control the rate of flow of each basic stream, variable but predetermined conditions of flow are imposed on each of these streams. These variable and predetermined conditions are imposed on each basic stream before its introduction into the inlet area or after its extraction from the outlet area. These conditions are imposed according to the location of the introduction or extraction orifice of the basic stream in the inlet area or in the outlet area and according to the rate of flow which one wishes to impose on this stream. By way of example, one of the means making it possible to impose a predetermined rate of flow on each basic stream may consist of an introduction or extraction orifice of variable but predetermined dimensions. These means will be described in more detail with the various embodiments of the apparatus according to the invention.

Figure 2:
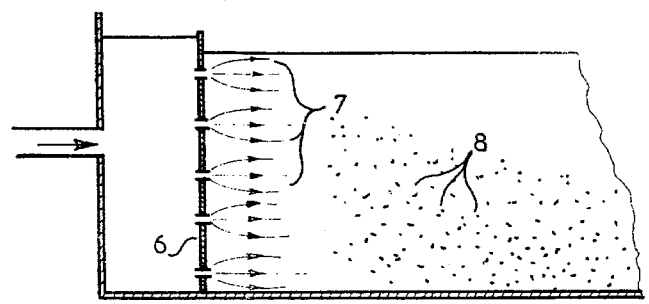
Figure 3:
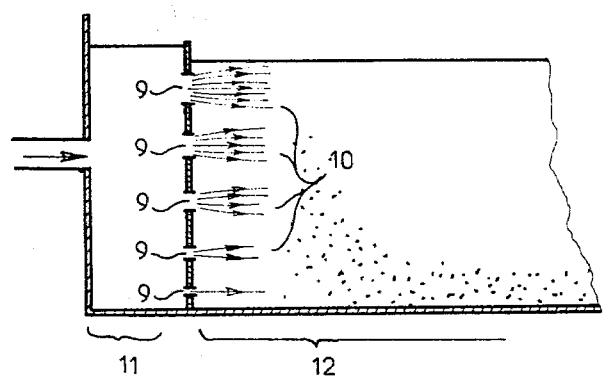
FIG. 3 shows diagrammatically and by way of example the flow of a liquid according to the present invention from a theoretical point of view.

FIGS. 1 to 3 show diagrammatically and by way of example, in the case of treatment by decantation, the method according to the invention and the methods according to the prior art. In FIG. 1, the liquid is introduced by means of an overflow 1 constitutes for example by a wall 2 extending from the bottom of the tank 3 to substantially the surface of the liquid. The arrows 4 represent the preferred flow of the liquid in the tank which is substantially in the shape of a bevel. A still area 5 is formed at the bottom of the tank, where the fluid is substantially static.

FIG. 2 shows diagrammatically the flow of liquid distributed uniformly by a perforated wall 6, the perforations being distributed uniformly and having identical dimensions. The arrows 7 represent the flow of fluid. The flow of this fluid is not suitable for the treatment by decantation, in view of the fact that the impurities represented by the dots 8 are carried along by the flow of fluid. In general, in a similar case, it should be noted that currently existing apparatus comprise a plurality of walls such as the wall 6 distributed throughout the volume of the tank in order to keep the flow of liquid uniform.

According to the present invention, in FIG. 3, in the case of treatment by decantation, the fluid is introduced or extracted, in basic streams represented by the reference numerals 9. This introduction is effected in the inlet area 11 of the tank. The reference numeral 12 designates the treatment area of the tank, i.e. the area where the liquid effectively undergoes the treatment. The basic streams 9 are introduced in the treatment area with increasing rates of flow from the bottom of the tank to the surface, as shown diagrammatically by the arrows 10. In order to obtain these increasing rates of flow, the conditions of flow are varied from the bottom of the tank up to the surface, for each basic stream 9.

Consequently, the lower the level of impurities introduced into the treatment area with the liquid, which tend to drop to the bottom of the treatment area by gravity, the less they will be influenced and carried along by the movement of the flow of liquid. Decantation will thus be more rapid and more homogeneous. Furthermore, at the surface, the liquid will be decanted more quickly and may therefore be extracted more quickly. The efficiency of the treatment apparatus is thus improved.

However, it should be noted that what has been explained with reference to FIGS. 1 to 3 may be achieved in a similar manner by suction of the liquid at the level of the outlet area of the tank, i.e. at the level of the extraction area of the liquid. In this case, it is sufficient to reverse the direction of the arrows 4, 7 and 10.

Moreover, in the case of a treatment by flotation, the distribution of speeds according to the invention decreases from the bottom of the tank to the surface, in order to promote the rising of impurities to the surface. The pressure drops which are imposed on the various basic streams will thus decrease from the bottom of the tank up to the surface.

However, the invention is not limited to a distribution of the rates of flow of the basic streams depending on the depth at which they are extracted or introduced into the volume of the tank. In fact, this distribution may vary horizontally in order, for example, to compensate for slowing-down or turbulence to which the liquid is subjected close to the side walls of the tank. The distribution of speeds may also take into account the shape of the tank as well as the presence or absence of specific treatment means such as for example distribution paddles or lamellar cells.

Furthermore, the invention also relates to any treatment of liquid other than a treatment by flotation or by decantation, in which it is advantageous to impose a predetermined distribution of speeds in the tank.

Various embodiments of an apparatus carrying out the method will now be described by way of example. However, the object of these examples is to illustrate the present invention and not to limit the latter. In fact, numerous means exist for imposing predetermined flow conditions on basic streams, in order to impose a rate of flow thereon. More particularly, it is possible to use a combination of different means in order to define this law of distribution.

In FIG. 4, a tank 13 is shown partly in section. This tank has any shape which is suitable for the treatment which the liquid undergoes. A liquid circulates in this tank, whereof the maximum upper surface at the level of one of the side walls has been shown diagrammatically by the dot dash line 17. This liquid is introduced into the tank in its inlet area, which is not shown in FIG. 4, passes through the treatment area 14 and is discharged from the outlet area 16.

The apparatus will now be described in the case where the distribution of speeds of the liquid is controlled from the outlet area. The means which make it possible to control the distribution of speeds could equally well be located in the inlet area, as will become apparent hereafter.

The treatment area of the tank may be defined as the area in which the stream of liquid is stabilized after its introduction into the tank and before its discharge. The inlet area may be defined as the introduction area of the liquid into the tank, including the area close to this introduction area where turbulence of the liquid occurs on account of its introduction into the tank. The outlet area may be defined in the same manner for the extraction. As will become apparent hereafter, the means for defining the distribution of speeds also make it possible to reduce the turbulence phenomenon of the area in which they are located, which also increases the treatment area.

In FIG. 4, the means for imposing from the outlet area a distribution of speeds of the liquid in the volume of the treatment area comprise a set of tubes 18. In the apparatus illustrated, these tubes are arranged transversely respect to the direction 19 of the stream of liquid in the treatment area and extend over the width of the tank, from the bottom 20 of the latter to at least the upper surface 17 of the liquid in the tank.

The tubes 18 are adjacent and their side facing the treatment area defines a wall 21 which extends along a cross section of the tank.

Over their entire height, the tubes respectively comprise walls 22 which separate them from each other in a sealed manner.

They also comprise orifices 23 which connect the inside of the tubes 18 to the inside of the volume of the tank. These orifices 23 are located in the wall 21. Each tube comprises at least one orifice for connection to the inside of the tank.

These orifices are located at different heights, with respect to the upper surface 17 of the liquid and may have different dimensions.

In the case of FIG. 4, each orifice extracts from the treatment area 14 of the liquid, a basic stream of liquid represented by the various arrows 24. The different dimensions of each orifice define the rate of flow of each basic stream of liquid extracted. The tubes thus make it possible to locate accurately the various withdrawals of a basic stream of liquid and to determine the respective rate of flow of the latter. By these means, the speeds of liquid throughout the entire volume of the treatment area are determined by the location and dimensions of various orifices 23.

At a level at the most equal to the level 17 of the upper surface of liquid, each tube also comprises an orifice 25 for connection to the outside, which is separated from the treatment area.

In the example illustrated, these orifices are constituted by the upper part of each tube 18, at the level of which the rear wall 26 of the various tubes rises to a level at the most equal to the upper surface 17 of the liquid. For each tube, each wall 26 thus constitutes an overflow above which pass the basic streams of liquid collected by each tube. The reference numeral 27 designates a deflector at the level of each overflow.

Behind the set of tubes, a compartment 28, separated in a liquid-tight manner by the set of tubes or at least by one of its walls from the treatment area, is connected to each of the tubes, through the intermediary of orifices 25, i.e. their respective overflow. This compartment 28 collects the various basic streams of liquid, conveyed by each tube, which may then be discharged, for example through a suitable pipe 29.

Thus, in the example which has been described, the flow conditions of each basic stream are determined by the dimensions of the orifice 23 through which it passes, by the distance separating this orifice from the upper surface 17 of the liquid and by the height of the deflector 27 with respect to the upper surface 17 of the liquid.

Complementary means for regulating the flow conditions of each basic stream of liquid consist of giving each tube 18 a variable cross section. This cross section may either be constant over the same tube and vary from one tube to another, for example by locating the walls 22 at variable distances. It is also possible to vary the section of a tube from the bottom of the tank to the surface of the liquid, for example by inclining one of the walls 21 or 26.

As an example, in the case of treatment by decantation, it may be advantageous if the tubes have a section increasing from the bottom of the tank towards the upper surface of the liquid, in order to impose decreasing pressure drops on each basic stream from the bottom of the tank to the upper surface.

Furthermore, depending on the treatment which the liquid undergoes in the treatment area, it may be advantageous to connect the lower part of the various tubes to the volume of the treatment area. This may be achieved for example by using a wall 21 which does not descend to the bottom of the tank. However, it should be noted that in this case the compartment 28 remains separated from the treatment area.

Figure 7:
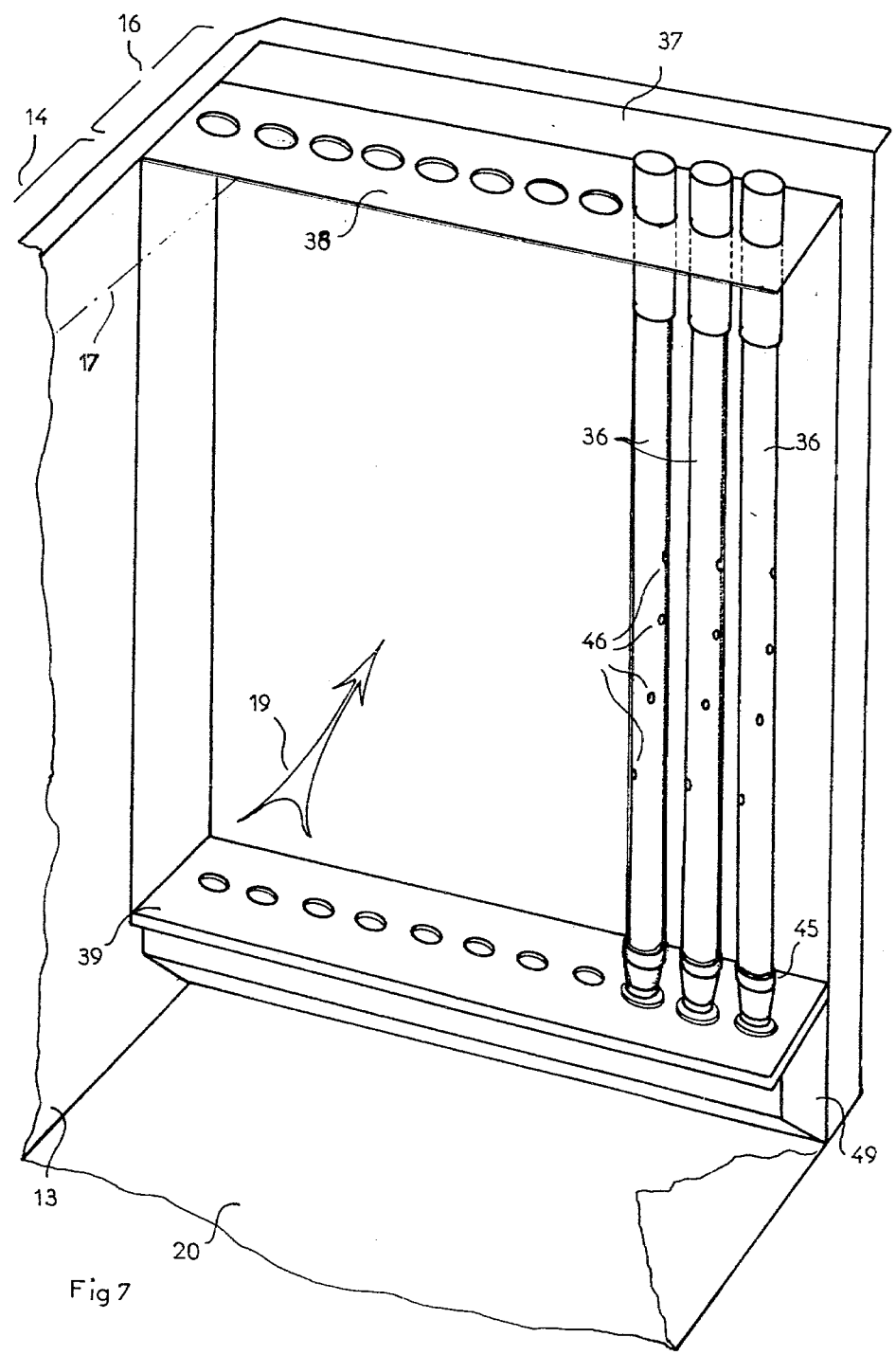

FIGS. 5 to 7 show other embodiments of the apparatus according to the invention. In these various figures, the same references as in FIG. 4 have been used to designate substantially similar parts, such as the tank 13, the areas 14 and 16, the orifices 23, the compartment 28 etc.

FIG. 5 shows a variation of the shape of the tubes 18. Instead of being straight, these tubes describe a bend in the vicinity of the bottom of the tank, then rise again adjacent the treatment area in the direction of the upper surface 17 of the liquid. It is in this ascending part of the various tubes that the orifices 23 are located at different distances from the surface of the water and having different dimensions.

Naturally, like the tubes 18 of FIG. 4, the tubes of FIG. 5 form a set and extend transversely with respect to the direction 19 of flow of the liquid in the treatment area.

In this apparatus illustrated in FIG. 5, the liquid removed at the surface has a slower rate of flow in the various tubes 18 than the liquid removed at the bottom, in view of the fact that the liquid removed at the surface has a greater distance to travel inside the tubes 18. This apparatus is thus particularly well suited for example to the treatment of a liquid by flotation, in view of the fact that in this case the concentration of impurities increases from the bottom of the tank to the surface of the liquid. Naturally, in this case the pressure drop of each basic stream of liquid is also controlled by the dimensions of the orifices which decrease from the bottom of the tank to its upper part.

The orifices for connecting the various tubes 18 of FIG. 5 to the outside are similar to those of the tubes of FIG. 4.

FIG. 6 relates to the case where the tank has a cylindrical shape of revolution and a conical shape in its lower part.

In this case, in known manner, the liquid is introduced into the central part of the tank through a pipe 31 which opens into the volume of the tank below the upper surface of the liquid 17. A wall 32, which is a cylinder of revolution, coaxial with the tank, extends from the bottom of the latter to at least the upper surface 17 of the liquid. This wall is provided with orifices 23 located at different heights and having different dimensions. This wall fulfils the function of the wall 21 of FIG. 3 and the orifices 23 of different dimensions and located at different distances from the upper surface 17 of the liquid define a plurality of basic streams having a variable rate of flow. This perforated wall 32 thus makes it possible to determine a distribution of speed for the flow of liquid in the volume of the tank.

After having been removed from inside the volume of the tank through the orifices 23, the liquid runs over a wall 33 which is a cylinder of revolution and is coaxial with the wall 32, which fulfils the function of the walls 26 of FIG. 4. The fluid is then collected in an annular compartment 34 from where it is discharged, for example through a pipe 35.

FIG. 7 shows another embodiment of the treatment apparatus according to the invention. This embodiment, like that of FIG. 3, comprises a set of tubes 36 which are substantially parallel, extending from approximately the bottom of the tank to at least the upper surface of the liquid. Only three tubes have been shown in FIG. 7. The number of tubes is in no way limiting and naturally depends on the volume of the tank.

These tubes are independent and spaced apart. In particular, they do not constitute a partition for the tank and are respectively surrounded, over their entire periphery, by the liquid in the area where they are located. These tubes are arranged transversely with respect to the direction 19 of flow of the liquid and are spaced from the wall 37 of the tank which is perpendicular to the direction of the stream in the outlet area.

In a preferred embodiment, these tubes are cylinders of revolution and are held by two supports 38 and 39 located respectively in the lower part and in the upper part of the latter. These supports are substantially horizontal and at right angles to the direction 19 of flow of the liquid. They respectively comprise circular orifices. The orifices in the support 38 have a diameter substantially equal to the outer diameter of the tubes and these tubes pass therethrough. The orifices in the support 39 will be described hereafter.

Figure 8:
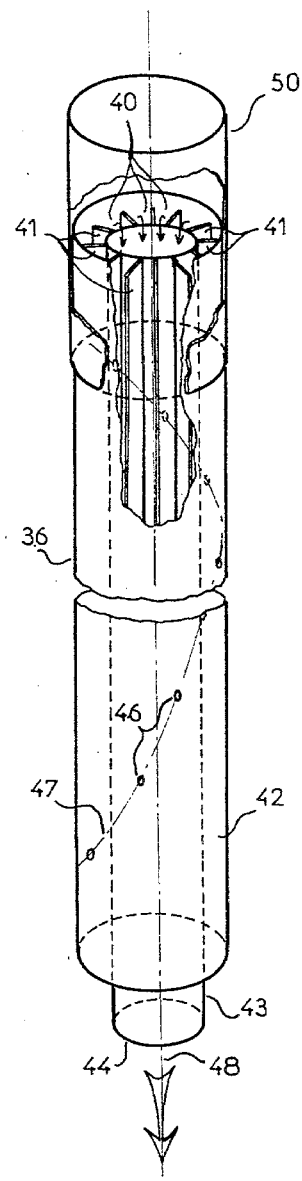
FIG. 8 shows one of the tubes of FIG. 7.

Internally, as shown diagrammatically in FIG. 8, the tubes are divided into a plurality of compartments 40. These compartments are defined by the wall 42 of the tube 36, by the wall 43 of a tube 44, which is also cylindrical and coaxial with the tube 36 and by partitions 41 located between the two walls 42 and 43 and perpendicular to each of the latter.

The upper part of the wall 42 of the tube 36 and the upper parts of the partitions 41 are located at a level at least equal to that of the upper surface 17 of the liquid in the tank. The upper part of the wall 43 of the tube 44 is in turn located at a level at the most equal to the level of the surface 17 of the liquid. The partitions 41 which define the compartments 40 extend substantially over the entire length of the wall 42 of the tube 36.

In a preferred embodiment, the lower part of the wall 43 descends beyond the lower part of the wall 42. A base 45 closes off the lower part of the compartments in a tight manner between the wall 43 and the wall 42.

The lower part of the wall 43 is introduced in a liquid tight manner into the orifices in the lower support 39 of the tube 36.

Each compartment comprises at least one orifice 46 for connection to the inside of the tank. As in the preceding cases, these orifices are located at variable distances from the upper surface 17 of the liquid and have variable but predetermined dimensions according to the distribution of speeds which one wishes to impose on the flow of liquid. Preferably for the same tube, the various compartments comprise only a single connection orifice and all the orifices are located on a helical curve 47 extending over the entire periphery of the wall 42 from the lower part of the latter to its upper part. Each orifice defines a point for the removal of liquid and thus a basic stream of liquid. The rate of flow in each compartment is determined in the present case by the distance of the orifices with respect to the upper surface 17 of the liquid and by their dimensions and the position of the upper deflector of the tube 43.

The distribution of speeds may thus be determined by these parameters. The orientation of the orifices with respect to the direction 19 of flow of the liquid is of little significance, in view of the low speed of flow.

Moreover, the tubes 36 which are spaced apart are completely surrounded by liquid. This thus makes it possible to increase the number of removal points with respect to the apparatus described in FIG. 4 and improve and specify the distribution of speeds which one wishes to impose on the flow of liquid in the treatment area 14.

The liquid is introduced by basic streams in each compartment through the orifices 46, ascends to the upper part of the various compartments and flows over the upper edge of the wall 43 inside this wall. The upper part of this wall thus fulfils the function of the walls 26 of FIG. 4.

In a preferred embodiment, the lower part of the walls 43 passes in a liquid tight manner through the support 39 and opens respectively into a general discharge pipe 49 located at the bottom of the tank at right angles to the various tubes. From this general discharge pipe 49, the fluid may be evacuated by any suitable means.

Preferably, in order to separate the upper part of the compartments and the tube 44 from the liquid located in the tank, a cap 50 fits on the upper part of the various tubes 33. This cap is a cylinder of revolution and has a lower diameter substantially equal to the outer diameter of the wall 42.

Taking into account the general discharge pipe 49, the tubes 36 extend approximately to the bottom 20 of the tank. Naturally, any suitable gasket is able to ensure the seal of the junctions between the various parts. Furthermore, the partitions 40 are connected to the wall 42 and to the wall 43 by any suitable means.

The tubes may be made for example from a plastic material which is compatible with the liquid and the treatment which it undergoes in the tank. Their maintenance and dismantling are facilitated by the fact that they are independent and that they may be disconnected easily from the supports 38 and 39.

As in the case of the tubes described with reference to FIG. 4, it is possible to vary the cross section of the different compartments by varying the spacing of the different partitions 41, or for example by placing the tube 44 off centre with respect to the tube 43. As was mentioned previously, this variation of the cross section takes into account the distribution of speeds which one wishes to impose on the flow within the treatment area.

It is obvious that the various apparatus which have been described and in particular the means for controlling the distribution of speeds are able to be placed both in the inlet area as well as in the outlet area of the tank. In fact, in this case, it is sufficient to reverse the direction of circulation of the liquid and of the various basic streams. However, in the particular case of a treatment by decantation or by flotation, the invention prefers locating these means in the outlet area so as not to disturb the formation of flocks which form during these treatments.

To summarize, the invention proposes to impose on the flow of a liquid in the treatment area, a distribution of predetermined speeds depending on the treatment which this liquid undergoes, from the inlet area or from the outlet area. This distribution of speeds makes it possible to use the volume of the treatment area with optimum efficiency by adapting the speed of flow of each layer of liquid and even of each thin stream of liquid to the treatment which this liquid undergoes in the tank. In a particular case, this distribution of speeds may be uniform, but it will generally be variable over the volume of the treatment area.

Moreover, it is also necessary to note that in the case where the treatment area comprises specific treatment means such as for example distribution paddles, the distribution of speeds takes into account these specific treatment means and their nature. However, these means are optional and the method and apparatus according to the invention complement these means in the case where they are present.

Naturally, the method and various apparatus for carrying out the method which have been described are given solely as an indication and other methods of implementing the present invention could be adopted without diverging from the scope of the latter.

What is claimed is:

1. Apparatus for the treatment of a liquid comprising:
   a tank defining an inlet area and an outlet area, which are located on opposed sides of a treatment area, the liquid entering the tank into the inlet area, passing through the treatment area and being discharged from the outlet area;
   a set of discrete tubes extending substantially vertically and disposed in a row extending over the width of said area transversely with respect to the direction of flow of the liquid in one of said areas other than said treatment area, the tubes being isolated from one another and extending vertically substantially from the bottom of the tank to the upper surface of the liquid, each of said tubes being U-shaped with a first side which ascends to at least the intended level of the upper surface of liquid in said tank and a second side which ascends at most to said upper surface of the liquid, said second side having at least one orifice for connection with said treatment area to define a stream of liquid in said treatment area, the orifices in different tubes being located at different levels and being of variable but predetermined different dimensions according to their locations and the rate of flow to be imposed on the streams which they respectively define, said first side of each tube also having an opening for connection to the outside of said tank located at the level of the intended upper surface of liquid in the tank and separated from the latter in a liquid-tight manner except for connection through said tube.

2. Apparatus for the treatment of a liquid comprising:
   a tank defining an inlet area and an outlet area, which are located on opposed sides of a treatment area, the liquid entering the tank into the inlet area, passing through the treatment area and being discharged from the outlet area;
   a set of discrete tubes extending substantially vertically and disposed in a row extending over the width of said area transversely with respect to the direction of flow of the liquid in one of said areas other than said treatment area, the tubes being isolated from one another and extending vertically substantially from the bottom of the tank to the upper surface of the liquid, each of said tubes comprising a main tube divided internally into a plurality of longitudinally extending compartments, separated from one another and extending respectively over the length of said tube, each of said compartments having at least one orifice for connection to said treatment area to define a basic stream of liquid, the orifices of different compartments being located at different levels and being of variable but predetermined dimensions according to their location and the rate of flow to be imposed on the streams which they respectively define, said compartments having a common opening for connection to the outside of the tank which is located at the level of the upper surface of liquid in the tank and separated from the latter in a liquid-tight manner except for connection through said compartments.

3. Apparatus as claimed in claim 2, in which each main tube contains over substantially its entire length, another axis parallel tube, connected in its upper part to each of the compartments of said main tube, at the level of said opening connecting each compartment to the outside, the lower part of the said axis parallel tubes opening respectively into a main pipe for the introduction or discharge of liquid into the inlet area or outlet area.

4. Apparatus as claimed in claim 3, in which two supports defining orifices support the tubes respectively in their upper part and in their lower part.

5. Apparatus as claimed in claim 3, in which said main tubes are cylindrical and in which said axis parallel tubes which they contain respectively are cylindrical.

6. Apparatus as claimed in claim 5, in which for each main tube, said tube which it contains is coaxial therewith and said compartments are distributed around this said coaxial tube.

7. Apparatus as claimed in claim 6, in which for each main tube, each compartment defining a single orifice, of variable but predetermined dimensions according to its location in the inlet area or in the outlet area and according to the rate of flow proposed for the stream which it defines, all the orifices are distributed on a helical curve extending over the periphery of said main tube, from its lower part to its upper part.

8. Apparatus as claimed in claim 7, in which said main tubes are covered respectively in their upper part with a cover, which separates the inside of said main tubes in a liquid tight manner at this level from the liquid contained in the volume of the tank.

* * * * *